US006095840A

United States Patent [19]
Yamaguchi et al.

[11] Patent Number: 6,095,840
[45] Date of Patent: Aug. 1, 2000

[54] MODULE CONSTRUCTION APPLIED IN CAR ROOF

[75] Inventors: Atsuyoshi Yamaguchi; Mitsuaki Morimoto, both of Shizuoka, Japan

[73] Assignee: Yazaki Corporation, Tokyo, Japan

[21] Appl. No.: 09/160,144

[22] Filed: Sep. 25, 1998

[30] Foreign Application Priority Data

Sep. 26, 1997 [JP] Japan ................................. 9-261967

[51] Int. Cl.⁷ .................................................. H01R 13/64
[52] U.S. Cl. ........................... 439/247; 439/34; 439/36; 439/248; 439/249; 439/953; 362/61
[58] Field of Search .............................. 362/61; 439/34, 439/36, 248, 249, 953

[56] References Cited

U.S. PATENT DOCUMENTS

| | | | |
|---|---|---|---|
| 2,116,317 | 5/1938 | Marshall et al. | 362/546 |
| 2,116,324 | 5/1938 | Prance | 362/548 |
| 3,035,161 | 5/1962 | Kalt | 362/479 |
| 4,584,631 | 4/1986 | Cody et al. | 362/61 |
| 4,893,867 | 1/1990 | Hilborn et al. | 296/214 |
| 5,081,564 | 1/1992 | Mizoguchi et al. | 362/61 |
| 5,357,408 | 10/1994 | Lecznar et al. | 362/74 |
| 5,546,288 | 8/1996 | Van Order et al. | 362/74 |
| 5,871,370 | 2/1999 | Kameyama et al. | 439/557 |

FOREIGN PATENT DOCUMENTS

| | | |
|---|---|---|
| 1-307180 | 12/1989 | Japan . |
| 3-86649 | 4/1991 | Japan . |
| 5-54104 | 7/1993 | Japan . |

Primary Examiner—Gary F. Paumen
Assistant Examiner—Truc Nguyen
Attorney, Agent, or Firm—Armstrong, Westerman, Hattori, McLeland & Naughton

[57] ABSTRACT

A module construction employed in a car roof has a front unit including a plurality of functional components, a circuit board for electrical connection, and a first connector connected to the circuit board, a second connector associated with the first connector and resiliently supported on a roof body, and a bracket secured to the roof body. The bracket has both a hook engaged with an insertion hole provided in the front unit and a spring plate for resiliently supporting the first connector. The plurality of functional components may include an interior roof lamp, a lamp switch, an antenna, and a rear view mirror. The antenna may be arranged to overhang in an upper portion of a front glass of the car. The hook and the spring plate each are formed by bending to raise a part of the bracket. The second connector has a locking clamp engaged with the insertion hole of the roof body, the locking clamp being radially movable in the insertion hole. The hook has a locking portion and an inclined portion adjacent to the locking portion that engages with an outlet edge of the insertion hole of the front unit. In addition, the inclined portion serves as a reflector for an interior roof lamp.

13 Claims, 12 Drawing Sheets

MODULE CONSTRUCTION APPLIED IN CAR ROOF

BACKGROUND OF THE INVENTION

1. Field of the Invention

This invention relates to a roof module construction having a front unit including an interior roof lamp, which is easily mounted in a fore roof body of a car.

2. Prior Art

FIG. 19 shows a known roof configuration with assembling constituents, which has been disclosed in Japanese Patent Application Laid-open No. H. 1-307180.

In the configuration, a wiring harness 76 is arranged under a roof body 75. The wiring harness 76 is laid over a ceiling panel 77 that has a plurality of openings 78 for drawing out a plurality of connectors 79 of the wiring harness 76. The connectors 79 are connected to the associated connectors of electrical equipment 80 including an interior roof lamp. The electrical equipment 80 is secured to the ceiling panel 77 with bolts 81.

The wiring harness 76 has a plurality of clamps 81 for securing the wiring harness 76 on the roof body 75. The ceiling panel 77 is made of a foamed plastic material. The electrical equipment 80 has a connector 82 engaged with the harness side connector 79. Furthermore, the electrical equipment 80 has a cover such as a lamp cover 83. The roof body 75 also is mounted with a rear view mirror, a sun visor, an interior roof lamp switch, a geomagnetic sensor, and so on mainly in a fore part thereof.

However, the above-mentioned known configuration requires a job for drawing out the harness side connector 79 through the opening 78 of the ceiling panel 77 to the car interior side. The configuration also requires a bolting job for securing a plurality of parts such as the electrical equipment 80 to the roof side, in which a worker must look upward in the bolting job. Therefore, it is too laborious for the worker to continue such work for a long time.

To lessen the disadvantage, there is proposed a roof configuration having a plurality of assembling constituents as shown in FIG. 20. In the configuration, a plurality of busbar circuits 85 are preliminarily embedded in a ceiling panel 84. An upper face of the ceiling panel 84 is covered by a cover panel 86. The assembled ceiling panel 84 is mounted in a roof body (not shown). The configuration may reduce arrangement work of the wiring harness, but still includes a disadvantage in mounting of the associated equipment.

In view of the above-described disadvantage, an object of the present invention is to provide a roof module in which the associated equipment is easily efficiently reliably mounted in a roof of a car.

SUMMARY OF THE INVENTION

For achieving the object, a first basic configuration according to the invention is a car roof module construction that includes:

a front unit including a plurality of functional components, a circuit board for electrical connection, and a first connector connected to the circuit board, a second connector associated with the first connector and resiliently supported on a roof body, and a bracket secured to the roof body, which has both a hook engaged with an insertion hole provided in the front unit and a spring plate for resiliently supporting the first connector.

The plurality of functional components may include an interior roof lamp, a lamp switch, an antenna, and a rear view mirror (this is a second configuration). The antenna may be advantageously arranged to overhang in an upper portion of a front glass of the car (a third configuration). The hook and the spring plate each are formed by bending to raise a part of the bracket (a fourth configuration). The second connector has a locking damp engaged with a through hole of the roof body, the locking damp being radially movable in the through hole (a fifth configuration). The second connector may have a supporting projection associated with the spring plate (a sixth configuration). The second connector may have an openable lid plate that abuts against the roof body when closed and a side opening for passing through a plurality of electrical wires that are conducted from the second connector and bent to make a right-angle turn to lead along the lid plate (a seventh configuration).

The hook may have a locking portion and an inclined portion adjacent to the locking portion. The locking portion engages with an outlet edge of the insertion hole of the front unit. The inclined portion serves as a reflector for an interior roof lamp (an eighth configuration). Furthermore, the reflector has a surface treated by plating or the like (a ninth configuration). Moreover, the surface of the reflector has a plurality of small protrusions for preventing the surface from a scratch when inserted into the insertion hole (a tenth configuration), or has a plurality of grooves both for preventing such an insertion scratch and for diffusion of light (an eleventh configuration).

Next, operational effects of the invention will be discussed.

As described above, in the first basic configuration of the invention, the single step that the roof body receives the front unit allows the mounting of a plurality of functional components at once, enabling a simplified and effective work step. Moreover, the resilient support for the connector in the roof body allows the sure mating of the connectors and the mounting of the front unit simultaneously. This is more advantageous in the connection work than the prior art that requires drawing-out work of the wiring harness for electrical connection to the associated opposed connectors. In addition, on the mounting of the front unit into the roof body, the hooks engage with the insertion holes of the front unit to be provisionally secured thereto. This engagement does not require to support the front unit by hand during securing thereof, allowing a simplified and efficient securing step.

According to the third configuration of the invention, the antenna improves in sensitivity. According to the fourth configuration of the invention, the hook and the spring plate are formed in one body with the bracket, eliminating a further assembling step of both the hook and the spring plate on the bracket, allowing reduction in the number of parts and in manufacturing cost of the car. According to the fifth configuration of the invention, the resiliently supported connector is easily assembled into the roof body so that the connector is supported by the locking clamp. Furthermore, the couple of connectors smoothly surely align with one another by the spring plates. According to the sixth configuration of the invention, each spring plate is finally positioned by locking with the supporting projection. Thus, the spring plates exert an even force on the resiliently supported connector, allowing a stable support of the connector after the connector is finally positioned. According to the seventh configuration of the invention, when the resiliently supported connector is assembled into the roof body, the lid abuts against the roof body to stop the connector. Thus, the lid bends the harness wires to lead the wires, eliminating bending work of the harness wires therein to improve the wire arrangement work in efficiency.

According to the eighth configuration of the invention, the inclined portion of the hook serves as a guide for the front unit when the hook is inserted into the associated hole. Furthermore, the hook resiliently returns its original position when the inclined portion has passed through the insertion hole. Thus, due to the spring force of the hook, the locking portion of the hook surely secures the front unit, enabling an easy, sure mounting of the front unit. Moreover, the inclined portion of the hook also serves as the reflector, eliminating a separated reflector to allow reduction in the number of parts and in manufacturing cost of the car. According to the ninth configuration of the invention, the reflector has the treated surface with an improved light reflection rate, which is a better quality for the car. According to the tenth or eleventh configuration of the invention, the protrusion or the groove on the reflector reduces the insertion force of the reflector and prevents the treated surface from suffering a scratch. The groove also improves the diffusion rate of light.

DETAILED DESCRIPTION OF PREFERRED EMBODIMENTS

Referring to the accompanied drawings, embodiments of the invention will be discussed in detail.

Figure 1:
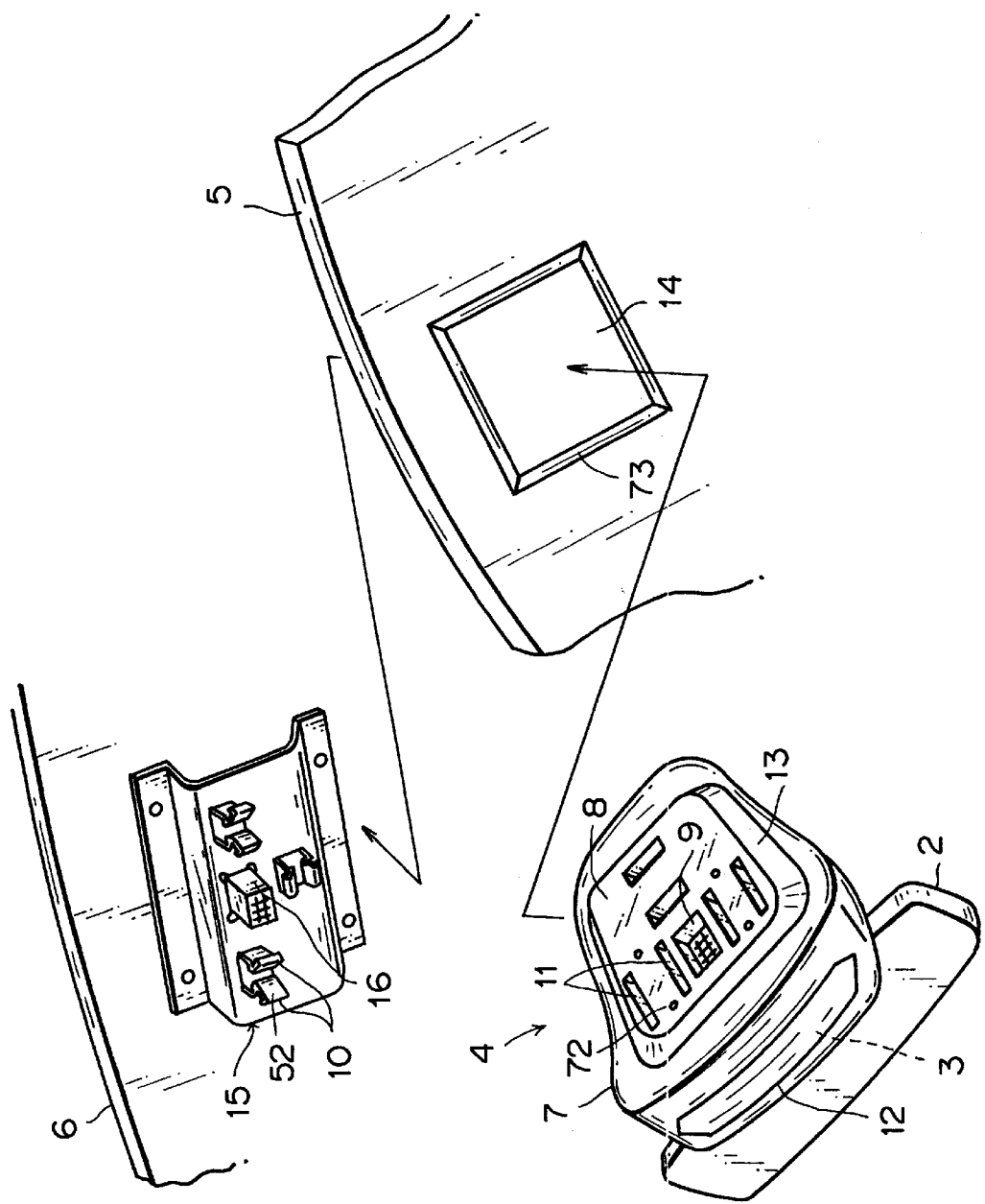
FIG. 1 is an exploded perspective view showing an embodiment of a roof module construction according to the invention.

FIG. 1 shows a roof module construction having a front unit 4 that has integrally a plurality of functional components including an interior roof lamp 1 (FIG. 2), a rear view mirror 2, and an antenna 3. The front unit 4 can be mounted on the roof body 6 through a ceiling panel 5.

The front unit has a main body 7 that is mounted with a receptacle connector 9 at the rear face 8 thereof. The connector 9 connects to an interior roof lamp circuit, an antenna circuit, etc. In the rear of and in each lateral side of the receptacle connector 9, there are provided a pair of insertion slots 11 for receiving the associated hooks 10 that each serve as a reflector, and there are a plurality of securing holes 72 for a bracket 15 fitted on a roof body 6. In the front face of the unit main body 7, there is provided an antenna receiving recess 12.

Furthermore, in the rear face 8 of the unit main body 7, there is provided a tapered stepped portion 13. The ceiling panel 5 has a forward opening 14 formed with a tapered peripheral surface 73 engaged with the tapered stepped portion 13. The engagement of the tapered stepped portion 13 and the tapered peripheral surface 73 correctly positions the front unit on the ceiling panel 5 with no gap therebetween. The ceiling panel 5 is mainly made of a foamed plastic material as a conventional panel, and covers almost all the roof body 6.

On the roof body 6, a bracket 15 of a channel shape is secured. The bracket 15 has a pin connector 16 oriented to engage with the receptacle connector 9. The pin connector 16 is resiliently supported to slightly move both in its longitudinal and lateral directions. In each lateral side and in the rear of the pin connector 16, there are provided plural pairs of hooks 10 that each serve as a reflector and are engaged with a through hole 11.

Figure 2:
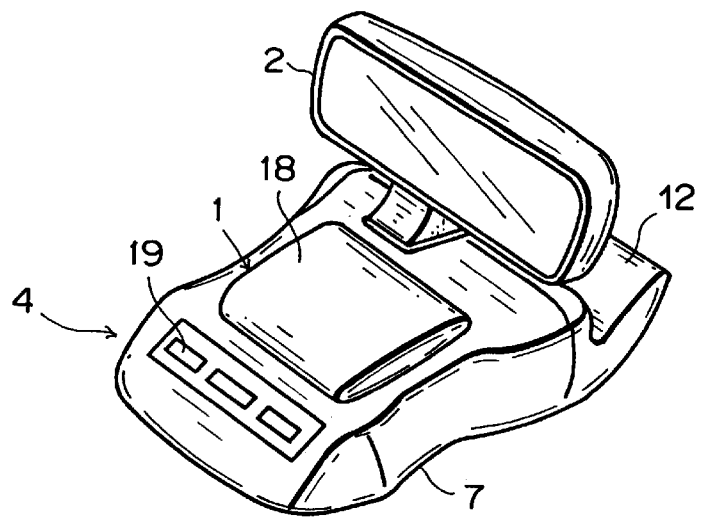
FIG. 2 is a perspective view showing a front unit in the roof module construction.
Figure 12:
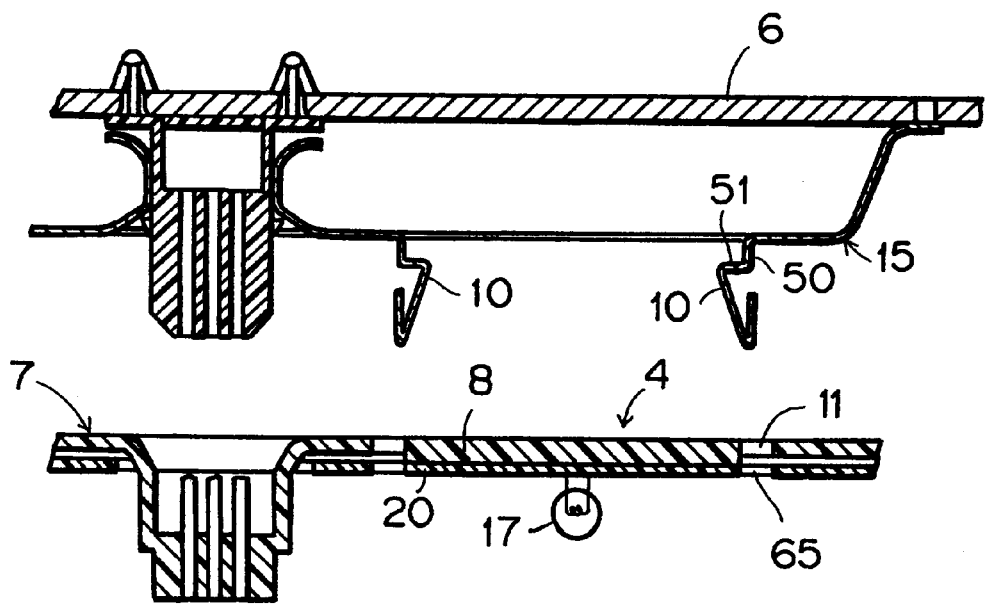
FIG. 12 is a longitudinal sectional view showing a step for assembling the front unit in the bracket side.

As shown in FIG. 2, the front unit 4 has the antenna receiving recess 12, the rear view mirror 2, and both a lens 18 and a switch button 19 for a lamp 17 (see FIG. 12).

Figure 3:
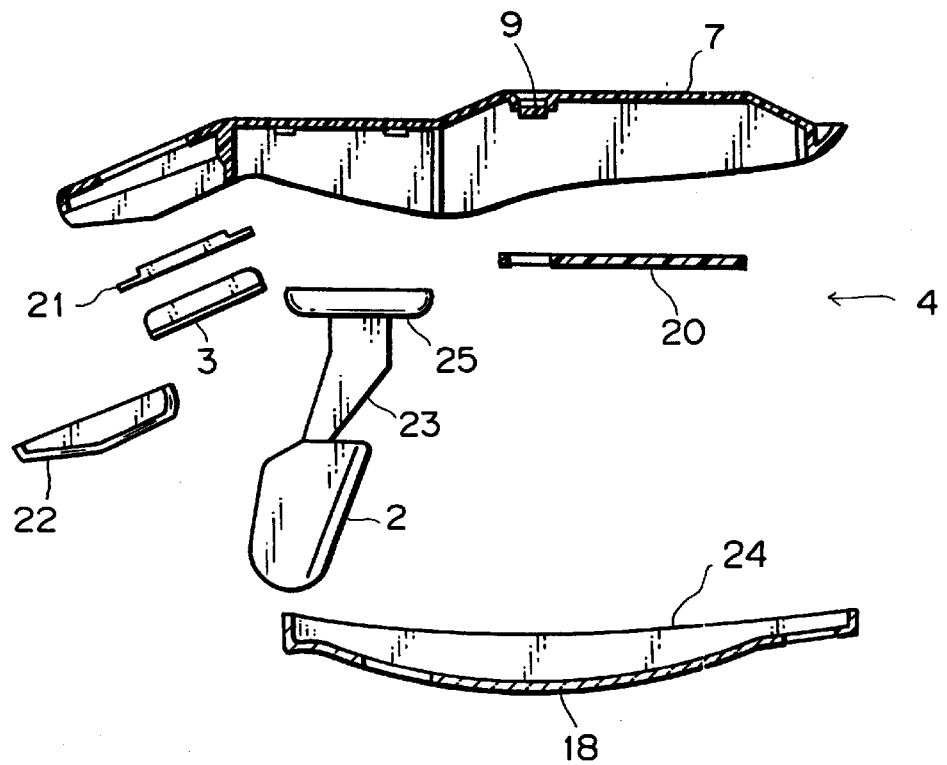
FIG. 3 is a longitudinal sectional view showing the front unit in an exploded condition.

As shown in FIG. 3, the unit main body 7, which is made of a synthetic resin material, includes the antenna 3 of a block shape, a base construction for the rear view mirror 2, and a circuit board 20 therein. The antenna 3 serves for a plurality of systems of GPS (global positioning system), VICS (Vehicle information and communication system), automatic toll payment, key-less entry, security, etc. The antenna 3 overhangs forward and is protected by both a upper cover 21 and a lower cover 22.

The mirror 2 is secured to the unit main body 7 by way of the base plate 25 having a pillar 23. The circuit board 20 including a lamp circuit and an antenna circuit (these are not illustrated) is mounted below the receptacle connector 9. The circuit board 20 is connected to the receptacle connector 9, the lamp circuit, a lamp 17 FIG. 12), the switch 19 (FIG. 2), and the antenna 3. A lens casing 24 for the lens 18 is fitted to the unit main body 7 that has been mounted with the switch button 19 and the mirror 2 having the extending pillar 23.

Figure 4:
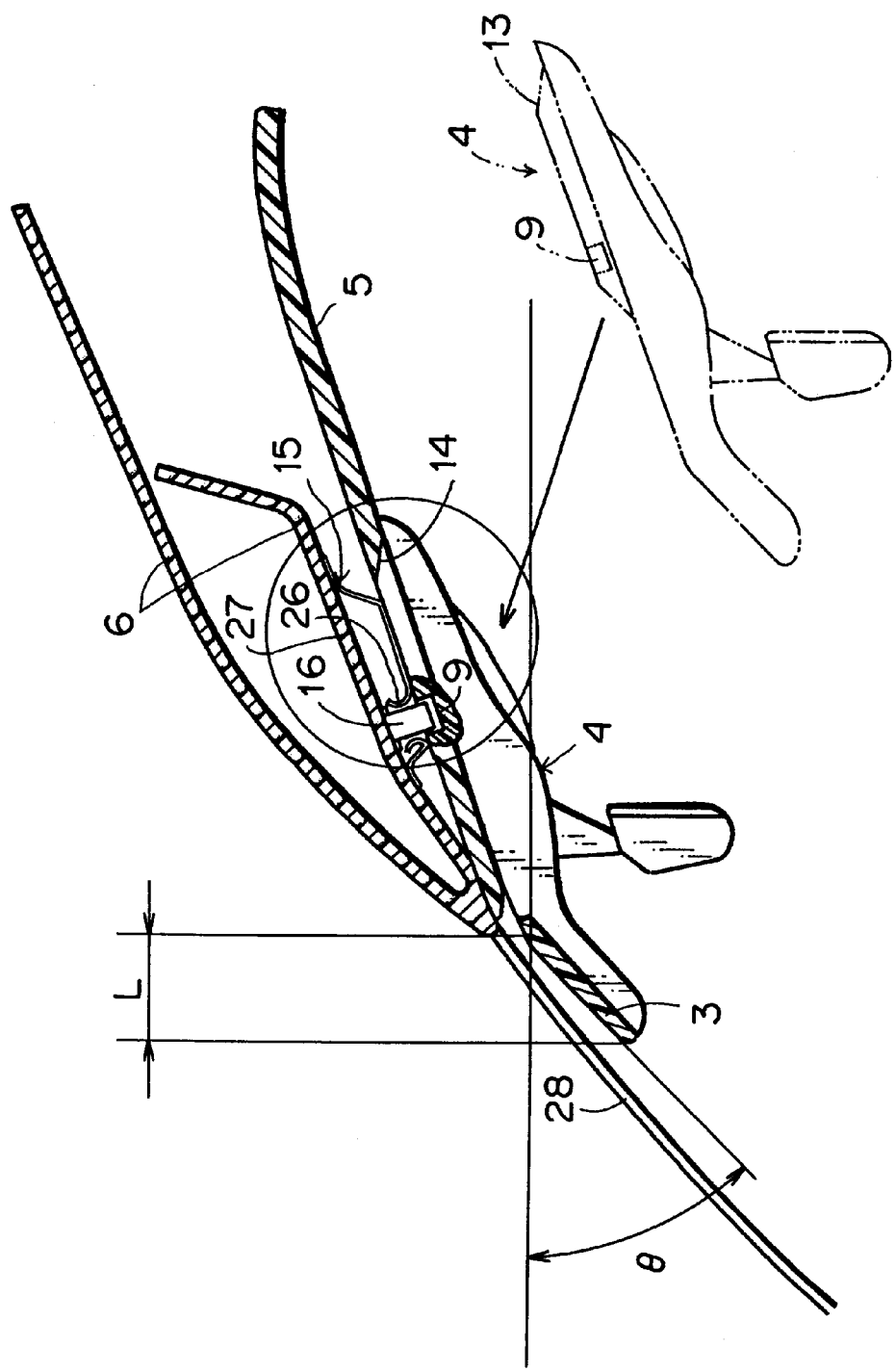
FIG. 4 is a longitudinal sectional view showing the state that the front unit has been assembled in a roof.

As shown in FIG. 4, the ceiling panel 5 is secured to the roof body 6. The fore opening 14 of the ceiling panel 5 receives the front unit 4. At the same time, a pin connector 16 provided in the roof body 6 couples with the receptacle connector 9 provided in the front unit 4. The pin connector 16 is resiliently supported by four spring plates 26 of the bracket 15 to allow a small deviation from the receptacle connector 9 in alignment. The front unit 4 is provisionally secured by the hooks 10 FIG. 1). The hook may be separately formed from a reflector.

The bracket 15 has been fitted to an inner turned-back panel 27 of the roof body 6. A wiring harness (not shown) led from the pin connector 16 is arranged along the turned-back panel 27. The antenna 3 received in the front unit 4 overhangs along an upper part of a front glass 28 at an angle θ (45°) to the horizontal. The overhang L is necessary for the antenna 3 to obtain a better sensitivity.

Figure 5:
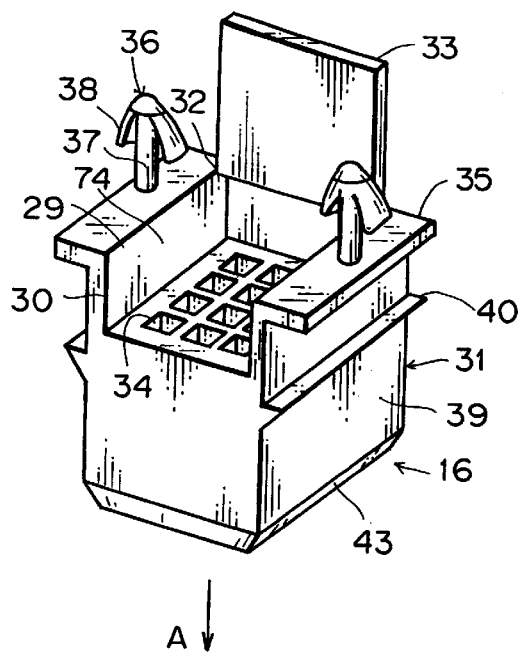
FIG. 5 is a perspective view showing a resiliently supported connector that will be attached to a roof body.

As shown in FIG. 5, the pin connector 16 has a connector housing 31 of a synthetic resin material and provided with upper and side openings 29, 30. The pin connector 16 also includes a lid plate 33 openably fitted to the housing 31 with a hinge 32 for closing the upper opening 29, a harness guide space 74 defined inside the openings 29, 30, a plurality of terminal receiving cavities 34 located under the harness guide space 74, a pair of locking clamps 36 projecting from an upper flange 35 provided in each side of the housing, and a pair of horizontal elongated projections 40 each formed on each side wall 39 of the housing for cooperating with the spring plates 26.

Figure 7:
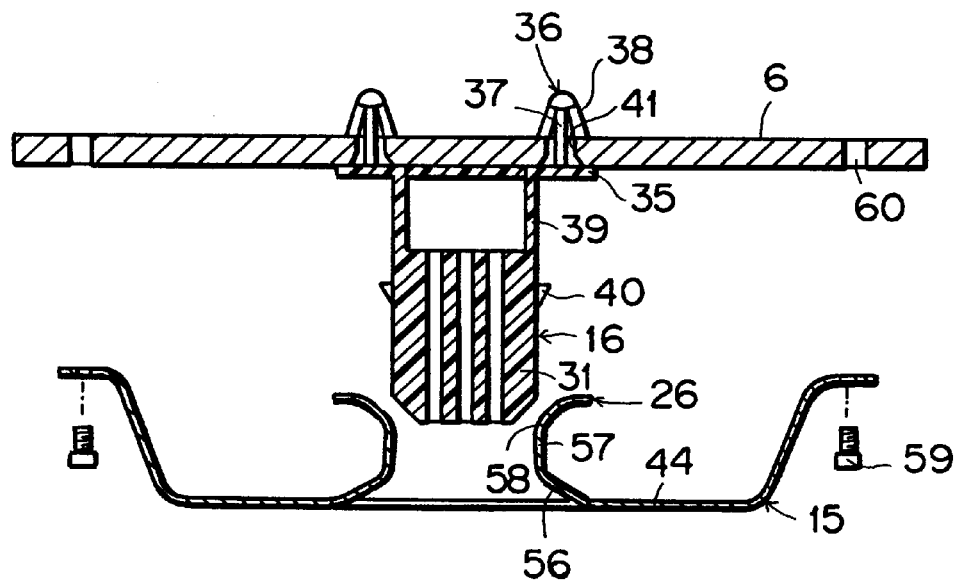
FIG. 7 is a longitudinal sectional view showing a step for assembling the bracket on the roof body.

The terminal receiving cavities 34 receive a plurality of receptacle terminals (not shown). A plurality of electrical wires (not shown) each connected to one of the terminals are led from the side opening 30, defining a wiring harness. The wiring harness is pressed against the closed lid 33 to bend to make a right-angle turn so as to lead through the side opening 30. The clamp 36 has a pillar 37 and a pair of downward directed locking hooks 38 at the head of the pillar 37. The locking hook 38 is engaged with a through hole 41 in the roof body 6 (FIG. 7) to hold the pin connector 16. An arrow head A shows the engagement direction of the pin connector 16 with the receptacle connector 9 (FIG. 7). The pin connector housing 31 has a leading end formed with a tapered guide face 43 associated with a housing 42 of the receptacle connector 9.

Figure 6A:
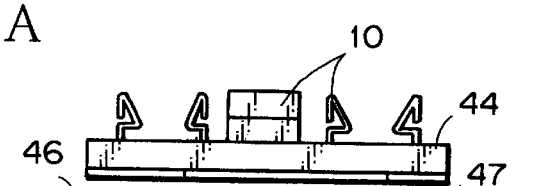
FIGS. 6A to 6C are respectively the front view, a plan view, and a side view for showing a bracket secured to the roof body.
Figure 6B:
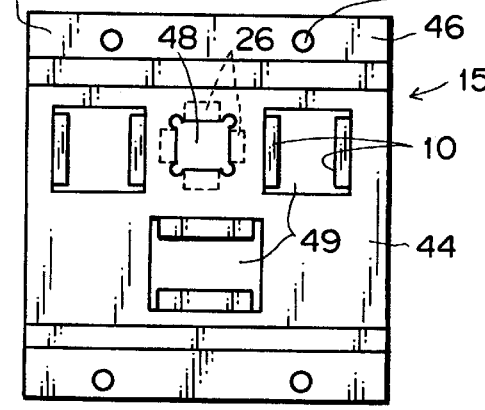
Figure 6C:
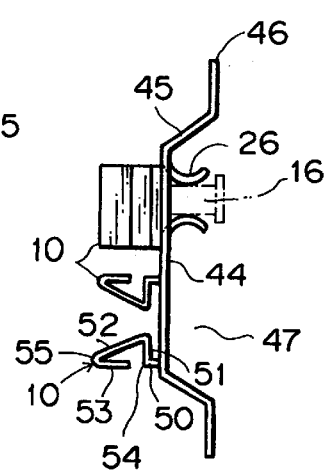

Referring to FIGS. 6A to 6C, the bracket 15 is made of a metal or a synthetic resin material in a body. The bracket 15 has a base plate 44 on which there are arranged a plurality of hooks 10 (each also serves as a reflector) and a plurality of the spring plates 26 for supporting the pin connector 16. The base plate 44 extends to define each side flange 46 by way of each inclined portion 45. Each side flange 46 has plural securing holes 47. The hook 10 rises up from the front face of the base plate 44. The spring plate 26 projects from the rear face of the base plate 44 to be located in a space 47 between the base plate 44 and the flange 46.

The four spring plates 26 are defined by partially cutting and raising up the base plate 44 around a rectangular insertion hole 48 in order to resiliently support the pin connector 16 longitudinally and transversely. A pair of opposing hooks 10 each are located in each lateral side or in each longitudinal side of the lamp insertion hole 49.

Each hook 10 includes a rising portion 50 raised vertically from the base plate 44, a locking portion 51 bent inwardly horizontally from the forward end of the rising portion 50, an inclined portion (a reflector) 52 outwardly inclined from the forward end of the locking portion 51, and a turned-back portion 53 turned vertically from the forward end of the inclined portion 52. Thus, the hook 10 has resiliency (elasticity). The rising portion 50 and the locking portion 51 define a locking gap 54. The inclined portion 52 and the turned-back portion 53 define a wedge-shaped insertion guide head 55.

FIGS. 7 to 11 show engagement steps of the receptacle and pin connectors 16, 9.

As shown in FIG. 7, the pin connector 16 is secured to the roof body 6 with the pair of clamps 36. The clamp through hole 41 of the roof body 6 is lager than the pillar 37 of the clamp 36 in diameter. Thus, there is a play gap between the pillar 37 and the through hole 41. The locking hooks 38 are locked to the roof body 6 to hold the flange 35. Then, the pin connector 16 receives the bracket 15 that is inserted so as to surround the pin connector 16. Each side wall 39 of the pin connector housing 31 has a locking projection 40 associated with each spring plate 26 of the bracket 15.

The spring plate 26 consists of an inclined portion 56 inwardly tapered from the horizontal base plate 44, a vertical abutment portion 57 raised from the forward end of the inclined portion 56 to abut against the side wall 39 of the pin connector 16, and a guide portion 58 divergently curved from the forward end of the abutment portion 57. The roof body 6 has, for example, a plurality of threaded holes 60 each associated with a bolt 59 for securing the bracket.

Figure 8:
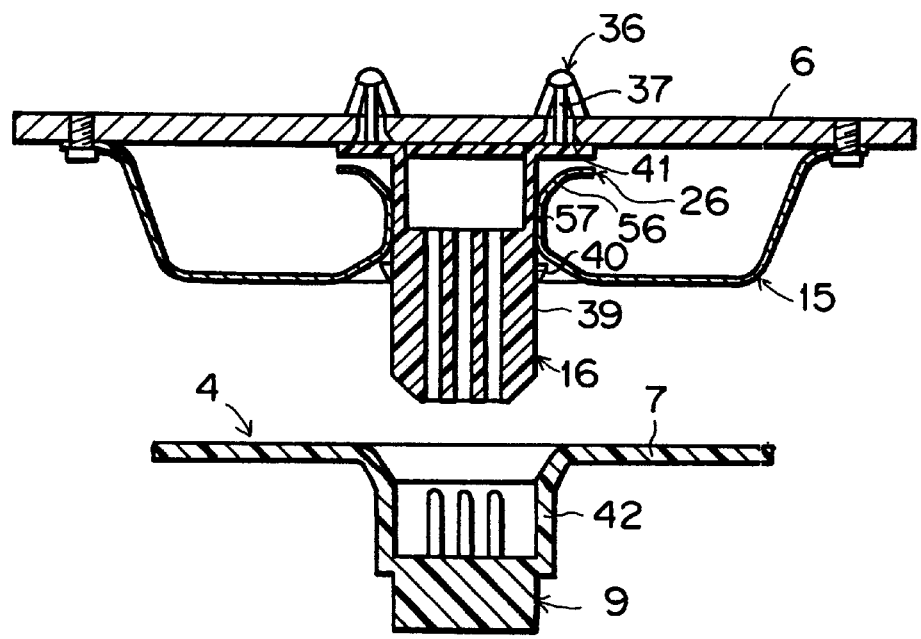
FIG. 8 is a longitudinal sectional view showing a step for assembling the front unit in the bracket side.

As shown in FIG. 8, the bracket 15 is secured to the roof body 6. In the securing step, the spring plate 26 slides along the side wall 39 of the pin connector 16 and rides over the supporting projection 40, so that the abutment portion 57 abuts against the side wall 39 above the supporting projection 40. Furthermore, the inclined portion 56 contacts the supporting projection 40 to position stably the spring plate 26 in the vertical direction thereof. The pin connector 16 is pressed evenly by the four surrounding spring plates 26, which aligns the pin connector 16 so that the pillar 37 of the clamp 36 is positioned substantially in the center of the insertion hole 41.

When the ceiling panel 5 (FIG. 4) receives the front unit 4, or when the ceiling panel 5 with the front unit 4 is fitted to the roof body 6, the receptacle connector 9 of the front unit 4 also engages with the pin connector 16 simultaneously.

Figure 9:
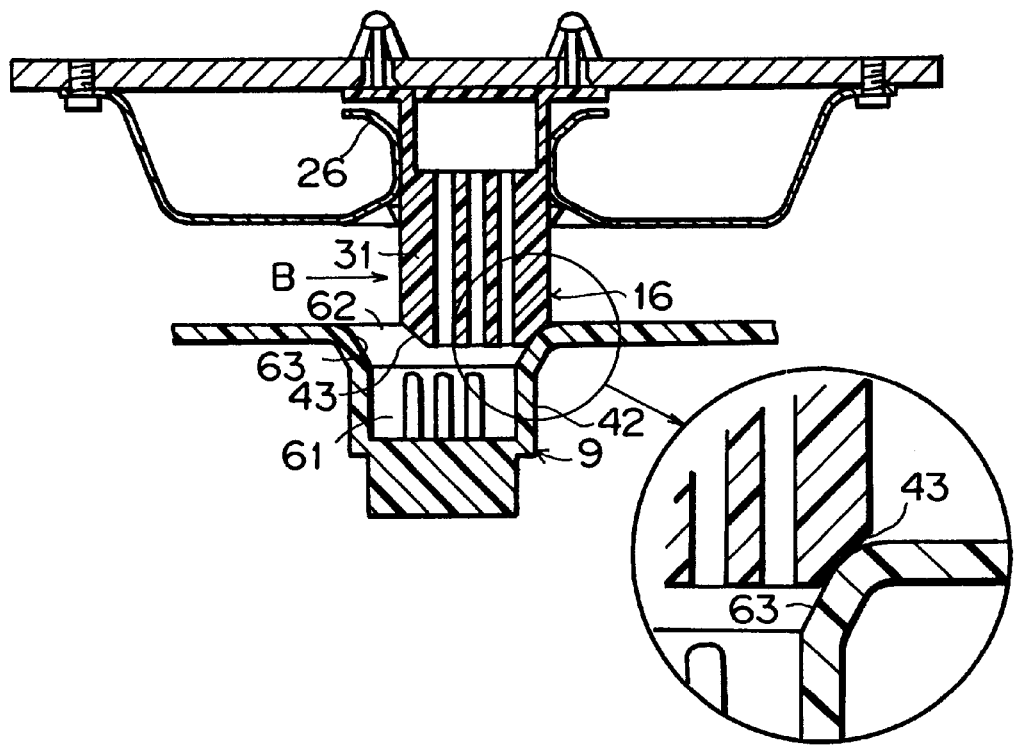
FIG. 9 is a longitudinal sectional view showing a step for aligning the front unit with a resiliently supported connector in the bracket side.

Before the engagement of the pair of connectors, when the connectors 16, 9 align with one another as shown in FIG. 9, a tapered guide face 63 of the receptacle connector housing 42, which is positioned around an opening 62 of a connector receiving recess 61, abuts against a tapered guide face 43 of the pin connector housing 31. This provides a force normal to the connector engagement direction for the pin connector 16 as shown by an arrow head B.

Figure 10:
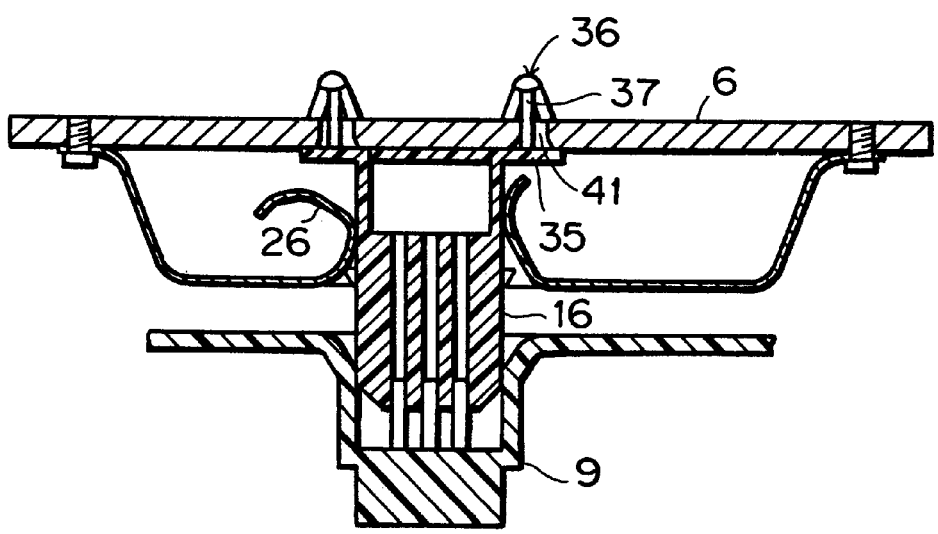
FIG. 10 is a longitudinal sectional view showing a pair of connectors in a half way of engagement.
Figure 11:
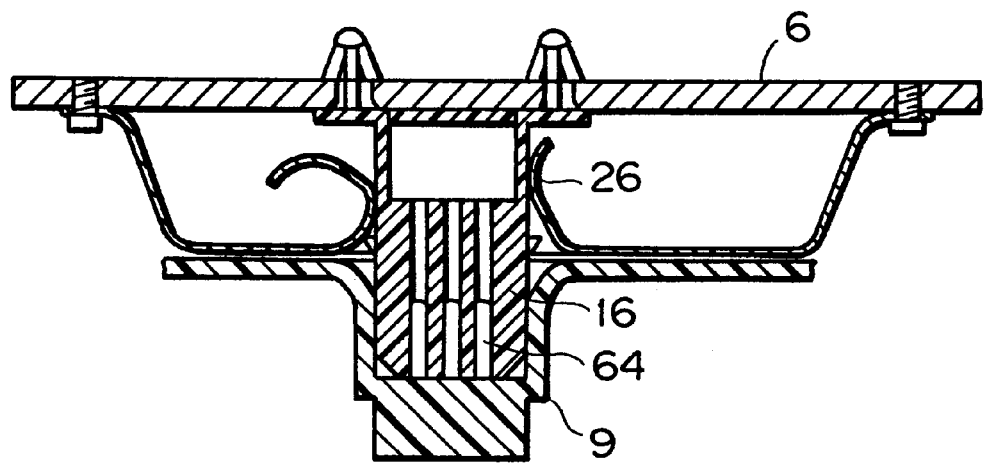
FIG. 11 is a longitudinal sectional view showing the connectors in a complete engagement state.

Thus, as shown in FIG. 10, the pin connector 16 deflects one of the spring plates 26 outwardly, which aligns the pin connector 16 to engage with the receptacle connector 9 as shown in FIG. 11 so that the pin terminals can connect to the associated receptacle terminals (not shown). On the alignment, the pillar 37 of the clamp 36 moves toward the center of the through hole 41, and the flange 35 of the pin connector 16 slides smoothly along the roof body 6.

FIGS. 12 to 15 show steps that the bracket 15 provisionally receives the front unit 4.

As shown in FIG. 12, on the mounting of the front unit 4, each insertion hole 11 of the unit main body 7 aligns with one of the pair of hooks 10 of the bracket 15. The front unit 4 has the circuit board 20 laid on a wall 8 of the unit main body 7. Thus, the circuit board 20 is formed with a pair of insertion holes 65 associated with the hooks 10. Halfway between the pair of insertion holes 65, there is provided a lamp (an electric light) 17.

Figure 13:
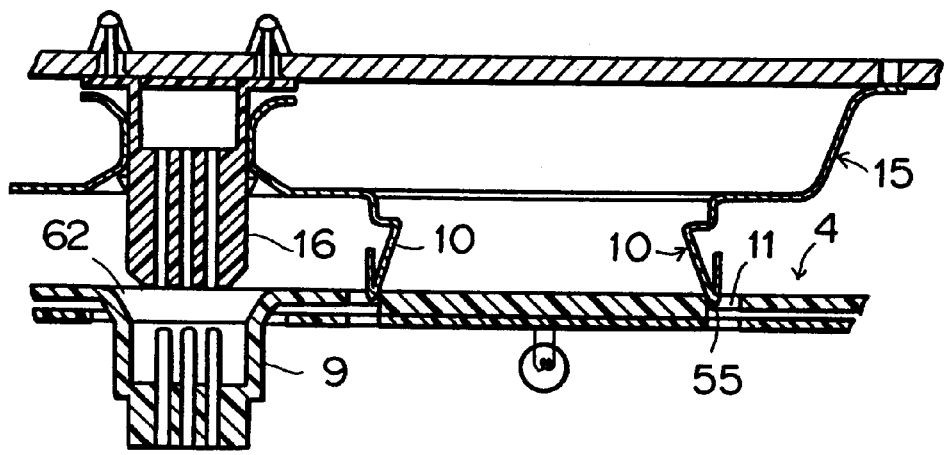
FIG. 13 is a longitudinal sectional view showing a state that hooks of the bracket are initially inserted into the front unit.

As shown in FIG. 13, when the front unit 4 begins to engage with the ceiling panel 5 (FIG. 4), the leading end 55 of each hook 10 is inserted into the insertion hole 11. At the same time, the fore end of the pin connector 16 orients toward the opening 62 of the receptacle connector 9.

Figure 14:
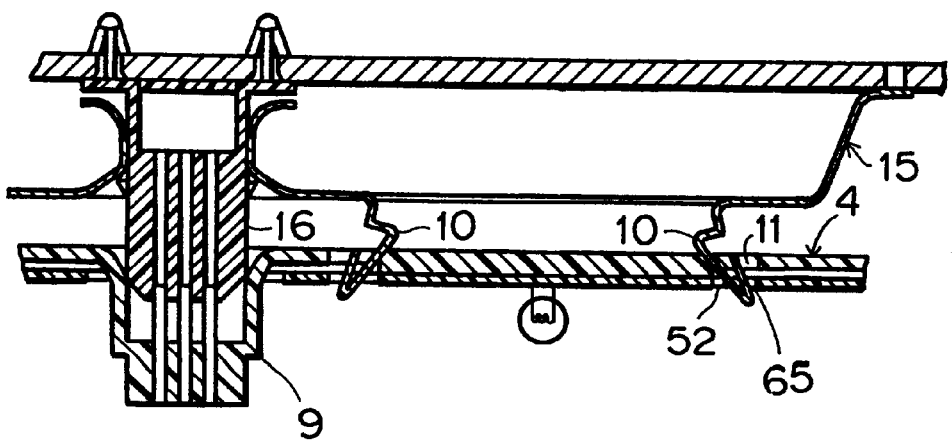
FIG. 14 is a longitudinal sectional view showing a state that the hooks of the bracket are deflecting to be inserted into the front unit.

As shown in FIG. 14, with the engagement of the front unit 4, the inside surface of the inclined portion 52 of the hook 10 advances along an edge of the insertion hole 11. Each hook 10 deflects outwardly to be inserted into the insertion hole 11. At that moment, both the connectors 16, 9 are in a half way of the engagement.

Figure 15:
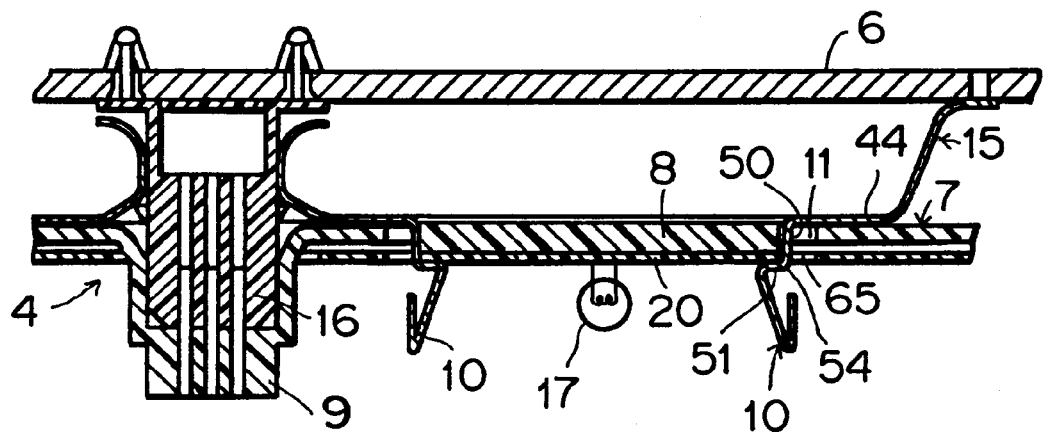
FIG. 15 is a longitudinal sectional view showing a state that the front unit is provisionally secured to the bracket.

In FIG. 15, the hook 10 has passed through the insertion hole 65 to resiliently return to its original position. The stepped portion 54 defined by the rising portion 50 and the locking portion 51 resiliently engages with an edge of the insertion hole 65. Furthermore, the locking portion 51 abuts against a surface of the circuit board 20 around the insertion hole 65. The wall 8 of the unit main body 7 abuts against the base plate 44 of the bracket 15. Thus, both the wall 8 and the circuit board 20 are locked to be held between the base plate 44 and the locking portion 51, so that the front unit 4 is provisionally secured to the bracket 15. At the same time, both the connectors 16, 9 have engaged with one another completely. Then, the front unit 4 is finally secured to the bracket 15 with bolts (not shown). However, the hooks 10 can secure the front unit 4 finally without the bolts.

Figure 16:
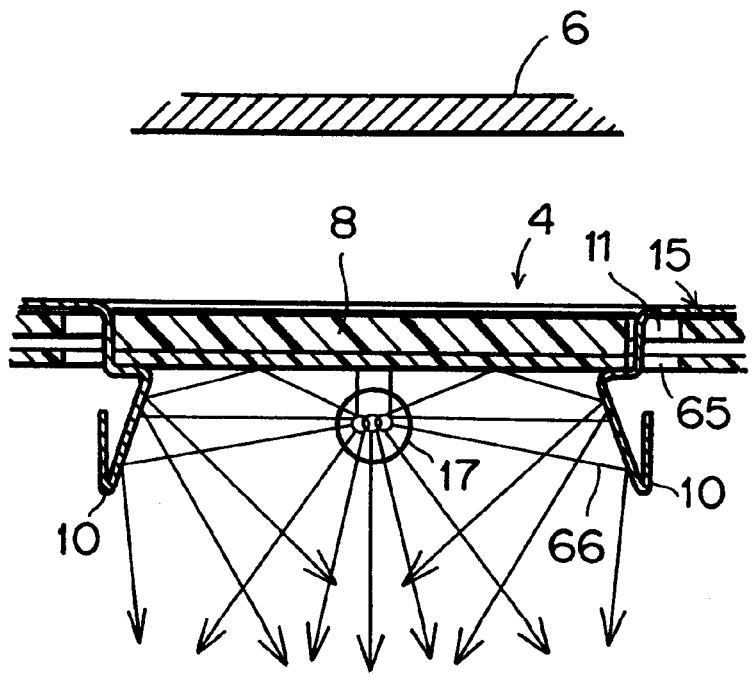
FIG. 16 is a longitudinal sectional view showing a state that the hooks each serve as a reflector.

Referring to FIG. 16, the pair of hooks 10 each serving as a reflector for the lamp 17 to defuse light rays 66. This reduces mounting space and mounting work for the front unit 4.

According to the above-mentioned embodiment, the integrated front unit 4 having the roof lamp provides one of more attractive amenities. Furthermore, the pre-oriented, resiliently supported connector 16 allows electrical connection of the wiring harness without drawing-out work of the electrical wires. Since the hook 10 of the bracket 15 serves also as a reflector in the front unit 4, the number of parts can be advantageously reduced. In addition, on an illumination test of the roof lamp 17, incomplete engagement of the hook 10 may be advantageously found.

Figure 17:
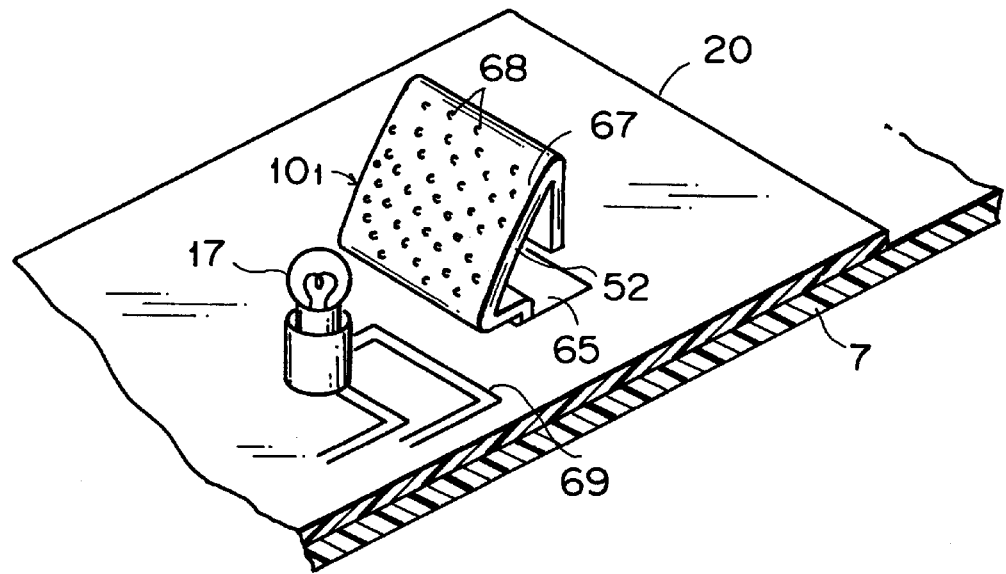
FIG. 17 is a perspective view showing another example of the reflector.

As shown in FIG. 17, a reflector 101 may have a surface 67 (corresponding to the inclined portion 52 of the hook 10) treated with galvanization or the like to obtain a better reflection rate. Furthermore, the surface of the reflector 101 may have a number of small protrusions 68, which prevents the treated surface 67 from suffering a scratch during the insertion of the reflector 101 into a through hole 65. In FIG. 17, denoted 17 is a lamp; 69 a lamp circuit; 20 a circuit board; and 7 a unit main body.

Figure 18:
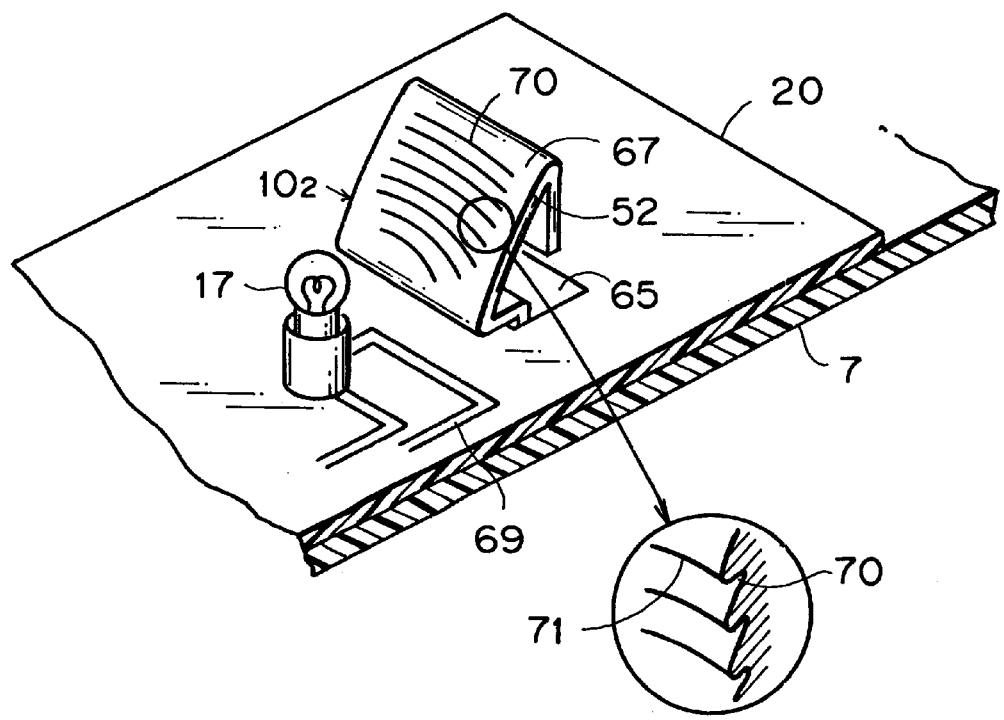
FIG. 18 is a perspective view showing a further other example of the reflector.
Figure 19:
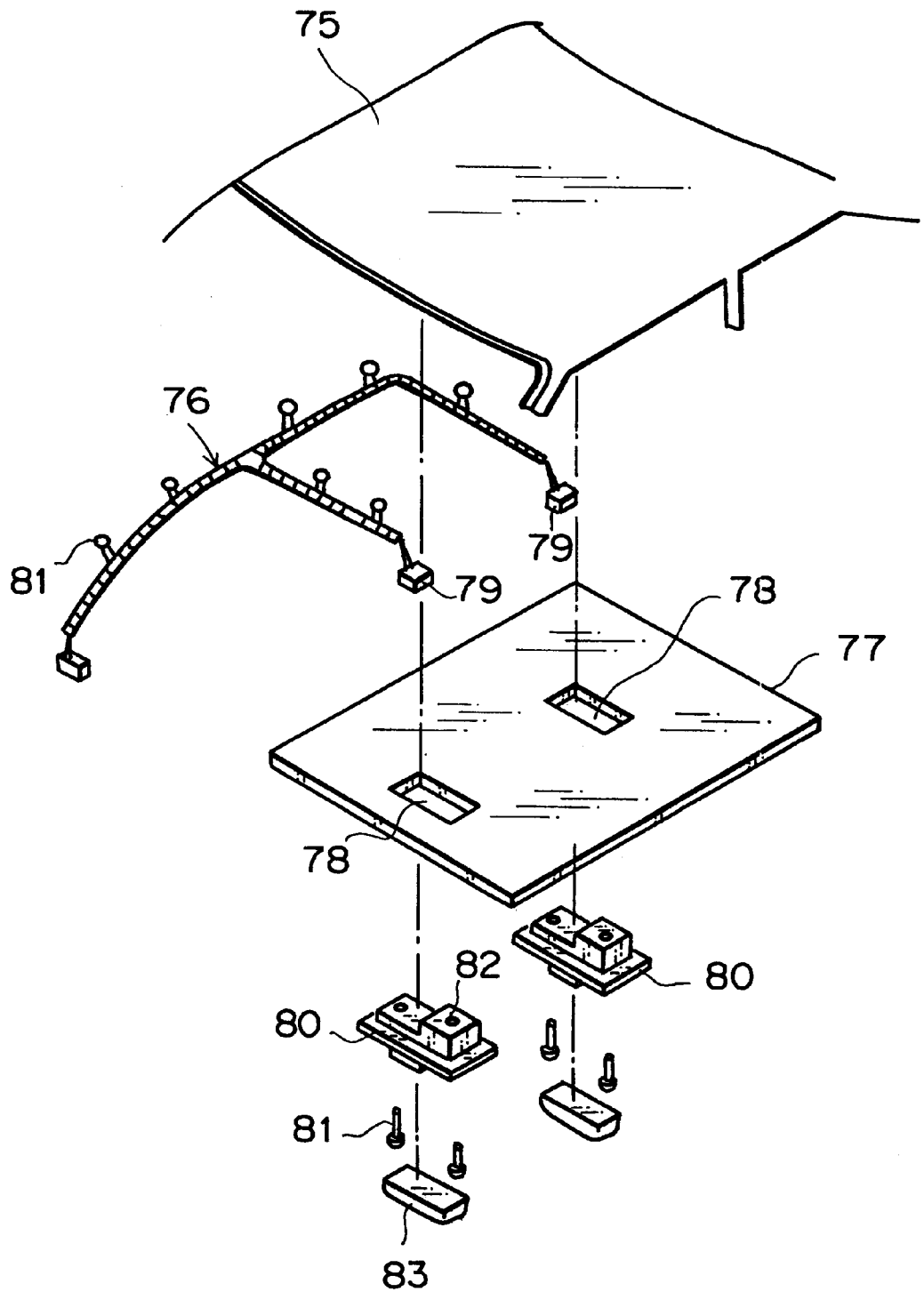
FIG. 19 is an exploded perspective view showing a known roof module.
Figure 20:
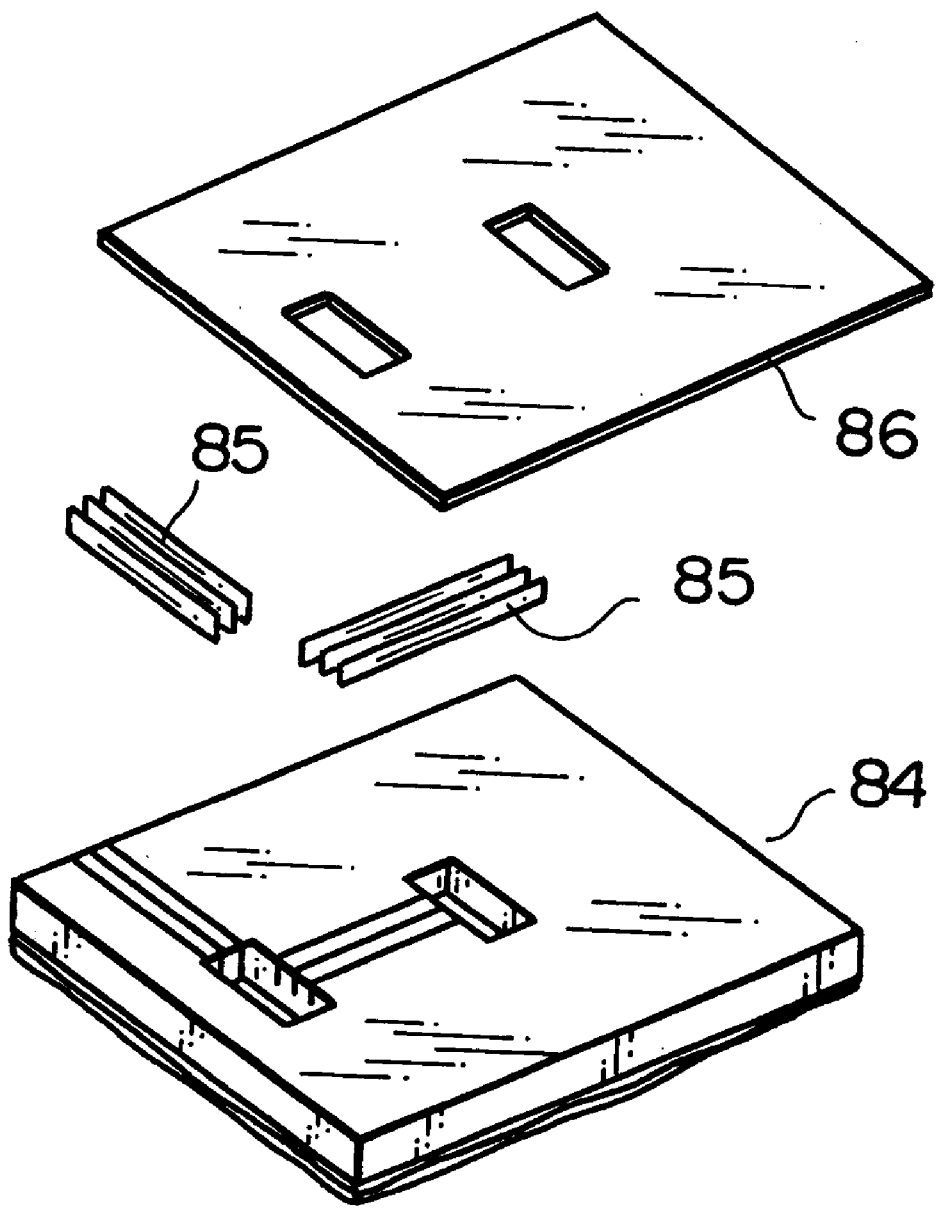
FIG. 20 is an exploded perspective view showing another known roof module construction.

As shown in FIG. 18, a reflector 102 (corresponding to the inclined portion 52 of the hook 10) may have a treated surface 67 on which a plurality of wave-like grooves 70 are formed for preventing the treated surface 67 from suffering a scratch. This arrangement provides also an effective diffusion of light. The grooves 70 may be, for example, an arcuate elongated projection 71 having a round top as illustrated in an encircled enlarged view. The same components as those in FIG. 17 are denoted by the same numerals, which will not be discussed again.

What is claimed is:

1. A module construction employed in a car roof comprising:
    a front unit including a plurality of functional components, a circuit board for electrical connection and a first connector connected to said circuit board;
    a second connector associated with said first connector and resiliently supported on a roof body; and
    a bracket secured to said roof body, which has both a hook engaged with an insertion hole provided in said front unit and a pair of spring plates for resiliently holding said second connector.

2. The module construction as recited in claim 1, wherein said plurality of functional components include an interior roof lamp, a lamp switch, an antenna, and a rear view mirror.

3. The module construction as recited in claim 2, wherein said antenna is arranged to overhang in an upper portion of a front glass of the car.

4. The module construction as recited in claim 1, wherein said hook and said spring plate each are formed by bending to raise a part of said bracket.

5. The module structure as recited in claim 1, wherein said second connector has a locking clamp engaged with a through hole of said roof body, said locking clamp being radially movable in said through hole.

6. The module construction as recited in claim 1, wherein said second connector has a supporting projection associated with said spring plate.

7. The module construction as recited in claim 1, wherein said second connector has an openable lid plate which abuts against said roof body when closed and a side opening for passing through a plurality of electrical wires that are conducted from said second connector and are bent to make a right-angled turn to lead along the lid plate.

8. The module construction as recited in claim 1, wherein said hook has a locking portion and an inclined portion adjacent to said locking portion, said locking portion being engaged with an outlet edge of said insertion hole of said front unit, said inclined portion serving as a reflector for an interior roof lamp.

9. The module construction as recited in claim 8, wherein said reflector has a surface treated with galvanization or the like.

10. The module construction as recited in claim 9, wherein said surface of said reflector has a plurality of small protrusions for preventing said surface from suffering a scratch when inserted into said insertion hole.

11. The module construction as recited in claim 9, wherein said surface of said reflector has a plurality of grooves both for preventing said surface from suffering a scratch when inserted into said insertion hole and for diffusion of light.

12. A module construction employed in a car roof comprising:
    a front unit including a plurality of functional components, a circuit board for electrical connection and a first connector connected to said circuit board;
    a second connector associated with said first connector and resiliently supported on a roof body; and
    a bracket secured to said roof body, which has both a hook engaged with an insertion hole provided in said front unit and a spring plate for resiliently supporting said second connector,
    wherein said second connector has a supporting projection associated with said spring plate.

13. A module construction employed in a car roof comprising:
    a front unit including a plurality of functional components, a circuit board for electrical connection and a first connector connected to said circuit board;
    a second connector associated with said first connector and resiliently supported on a roof body; and
    a bracket secured to said roof body, which has both a hook engaged with an insertion hole provided in said front unit and a spring plate for resiliently supporting said second connector, wherein said second connector has an openable lid plate which abuts against said roof body when closed and a side opening for passing through a plurality of electrical wires that are conducted from said second connector and are bent to make a right-angled turn to lead along the lid plate.

* * * * *